(12) United States Patent
Kosteva et al.

(10) Patent No.: US 11,108,101 B2
(45) Date of Patent: Aug. 31, 2021

(54) ACTIVE INTERNAL AIR COOLED VEHICLE BATTERY PACK

(71) Applicant: BAE Systems Controls Inc., Endicott, NY (US)

(72) Inventors: Stephen J. Kosteva, Endicott, NY (US); Arthur P. Lyons, Maine, NY (US)

(73) Assignee: BAE Systems Controls Inc., Endicott, NY (US)

( * ) Notice: Subject to any disclaimer, the term of this patent is extended or adjusted under 35 U.S.C. 154(b) by 99 days.

(21) Appl. No.: 16/057,927

(22) Filed: Aug. 8, 2018

(65) Prior Publication Data

US 2020/0052355 A1 Feb. 13, 2020

(51) Int. Cl.
*H01M 10/6566* (2014.01)
*H01M 10/613* (2014.01)
(Continued)

(52) U.S. Cl.
CPC ..... *H01M 10/6566* (2015.04); *H01M 10/613* (2015.04); *H01M 10/625* (2015.04); *H01M 10/6563* (2015.04); *F25D 19/00* (2013.01)

(58) Field of Classification Search
CPC ........ F25B 21/021; F25B 21/02; F25B 21/04; F25B 49/00; F25B 2321/0212;
(Continued)

(56) References Cited

U.S. PATENT DOCUMENTS

| 5,490,572 A | 2/1996 | Tajiri et al. |
| 5,832,988 A | 11/1998 | Misty et al. |

(Continued)

FOREIGN PATENT DOCUMENTS

JP 2013203190 A 1/2013

OTHER PUBLICATIONS

Slotnic, "Air to Air Heat Exchangers, How Air to Air Heat Exchangers Efficiently Cool Electrical Enclosures", Thermal Edge Inc., Jan. 1, 2017, pp. 1-8, http://thermal-edge.com/category/air-to-air-heat-exchangers/.

(Continued)

*Primary Examiner* — Jianying C Atkisson
*Assistant Examiner* — Jose O Class-Quinones
(74) *Attorney, Agent, or Firm* — Scully Scott Murphy & Presser PC; Scott J. Asmus

(57) ABSTRACT

A vehicle battery thermal management system and method providing active internal air cooling includes a heat exchanger mounted within an exterior wall of the battery enclosure. The heat exchanger has a first set of heat exchanger elements extending externally to the battery enclosure and in fluid communication with external ambient air. The heat exchanger has a second set of heat exchanger elements extending internally to the battery enclosure and in fluid communication with internal air within the battery enclosure. The system includes at least one of an external damper door and an internal damper door. The external damper door is configured to control the flow of the external ambient air into the first set of heat exchanger elements. The internal damper door is configured to control the flow of the internal air into the first set of heat exchanger elements.

9 Claims, 5 Drawing Sheets

(51) Int. Cl.
   *H01M 10/6563* (2014.01)
   *H01M 10/625* (2014.01)
   *F25D 19/00* (2006.01)

(58) Field of Classification Search
   CPC .............. F25B 2500/12; F25B 2700/11; F25B
                  2700/15; F25D 11/00; F25D 2700/121;
                  F25D 2700/14; B60H 1/00278; B60H
                  2001/003; B60H 1/00678; B60H 1/00842;
                  B60H 1/00849; H01M 10/613; H01M
                  10/625; H01M 10/6566; H01M 10/6563;
                  H01M 10/663; B60L 58/26; F24F 1/028;
                  F24F 13/10; F24F 2140/40
   See application file for complete search history.

(56) References Cited

U.S. PATENT DOCUMENTS

| | | | | |
|---|---|---|---|---|
| 6,094,927 | A * | 8/2000 | Anazawa | H01M 10/667 62/239 |
| 6,253,560 | B1 * | 7/2001 | Cava | B60H 1/3227 165/104.14 |
| 7,143,724 | B2 * | 12/2006 | Hashizumi | H01M 10/663 123/41.56 |
| 7,152,417 | B2 * | 12/2006 | Morishita | B60H 1/00278 62/186 |
| 7,621,262 | B2 | 11/2009 | Zubeck | |
| 7,974,095 | B2 * | 7/2011 | Murata | H01M 10/6567 361/699 |
| 8,205,702 | B2 * | 6/2012 | Hoermandinger | H01M 10/625 180/68.5 |
| 9,070,958 | B2 | 6/2015 | Obasih et al. | |
| 9,211,856 | B2 * | 12/2015 | Desbois-Renaudin | H01M 2/1072 |
| 9,385,405 | B2 * | 7/2016 | Murata | H01M 10/613 |
| 9,793,585 | B2 | 10/2017 | Obasih et al. | |
| 2001/0033961 | A1 * | 10/2001 | Gudmundsson | H01M 10/659 429/62 |
| 2003/0080714 | A1 | 5/2003 | Inoue et al. | |
| 2004/0061480 | A1 * | 4/2004 | Kimura | H01M 10/486 320/150 |
| 2004/0137313 | A1 * | 7/2004 | Jaura | H01M 10/613 429/62 |
| 2005/0074666 | A1 * | 4/2005 | Kimiya | H01M 10/637 429/62 |
| 2005/0242782 | A1 * | 11/2005 | Kadouchi | H01M 2/1072 320/150 |
| 2008/0276913 | A1 | 11/2008 | Zubeck | |
| 2011/0183177 | A1 * | 7/2011 | Sohn | H01M 2/34 429/120 |
| 2011/0256432 | A1 * | 10/2011 | TenHouten | H01M 10/6563 429/50 |
| 2011/0300421 | A1 * | 12/2011 | Iritani | H01M 10/625 429/72 |
| 2012/0003516 | A1 * | 1/2012 | Eisenhour | H01M 10/617 429/62 |
| 2012/0048505 | A1 | 3/2012 | Yu et al. | |
| 2012/0190292 | A1 * | 7/2012 | Skrepcinski | H05K 7/207 454/258 |
| 2012/0263988 | A1 | 10/2012 | Obasih et al. | |
| 2012/0267080 | A1 * | 10/2012 | Tsychkov | B60L 50/66 165/104.34 |
| 2013/0118707 | A1 * | 5/2013 | Kardos | H01M 10/625 165/42 |
| 2013/0149583 | A1 * | 6/2013 | Kurita | H01M 10/625 429/120 |
| 2013/0273829 | A1 | 10/2013 | Obasih et al. | |
| 2014/0051345 | A1 * | 2/2014 | Bauer | F24F 3/0522 454/267 |
| 2014/0193683 | A1 | 7/2014 | Mardall et al. | |
| 2015/0037633 | A1 * | 2/2015 | Akiyama | H01M 10/617 429/83 |
| 2015/0118536 | A1 * | 4/2015 | Iwasa | H01M 10/625 429/120 |
| 2015/0121939 | A1 * | 5/2015 | Takeuchi | F25B 13/00 62/324.6 |
| 2015/0280292 | A1 * | 10/2015 | Nagano | B60L 1/02 165/80.2 |
| 2015/0303534 | A1 | 10/2015 | Obasih et al. | |
| 2015/0340745 | A1 * | 11/2015 | Inoue | H01M 10/613 429/120 |
| 2016/0226111 | A1 * | 8/2016 | Blume | H01M 10/613 |
| 2016/0325598 | A1 * | 11/2016 | Schumann | H01M 10/6563 |
| 2017/0028869 | A1 * | 2/2017 | Boddakayala | H01M 10/613 |
| 2017/0214008 | A9 | 7/2017 | Mardall et al. | |

OTHER PUBLICATIONS

International Search Report, PCT/US19/43267, dated Oct. 21, 2019, 9 pages.

* cited by examiner

US 11,108,101 B2

ACTIVE INTERNAL AIR COOLED VEHICLE BATTERY PACK

FIELD OF DISCLOSURE

The present disclosure is directed to vehicle battery management and more particularly to active internal air cooling of a vehicle battery pack.

BACKGROUND

Today's hybrid and electric vehicles are designed to maximize efficiencies and thus lower the fuel consumption of the vehicle. As referenced herein, vehicle refers to any mobile asset such as a car, bus, truck, ship, or plane. As on example, most hybrid and electric vehicles employ the use of battery stored energy in energy storage packs to supplement the high energy demands on the engines during accelerations and hill climbs and recapture energy during hill descends and decelerations. Other examples include tug boats that have higher energy demands when moving a barge. The batteries used on these vehicles have been evolving over time and many advances in chemistries and constructions have made the batteries more capable in improving vehicle fuel economy. Similarly, electric vehicles have battery demand requirements that are optimized when the batteries operate in a temperature range.

Even with the improvements in the battery technology, these batteries have fundamental wear out mechanisms. One important wear out mechanism includes the operating temperatures at which the batteries are maintained both during operation and when they are not being used (storage). When operated too hot, the chemistry within the battery accelerates causing premature rapid breakdown. When operated too cold, the chemistry slows down and their impedance increases causing higher internal local voltages potentials within the cell damaging chemical plating of the anodes cathodes and breakdown of the separators.

The majority of hybrid and electric battery cell chemistries have an optimal operating temperature of around 25-30 degrees Celsius for longer life. Longer life on the battery equates to a lower life cycle cost of the battery system and the hybrid vehicle. The energy storage packs typically connect together many batteries in series to bring the pack to a nominal operating voltage in order to efficiently process the power and electrical currents required for propelling the vehicle. These nominal voltages generally are hundreds of volts making the systems categorized as "High Voltage". These high voltages are sensitive to dirt and debris and maintaining a clean battery environment is also key to long life and proper operation.

BRIEF SUMMARY

A vehicle battery thermal management system is disclosed in one embodiment for providing active internal air cooling for a battery enclosure housing a plurality of batteries. The system in one embodiment includes a heat exchanger mounted within an exterior wall of the battery enclosure. The heat exchanger has a first set of heat exchanger elements extending externally to the battery enclosure. The first set of heat exchanger elements are in fluid communication with external ambient air. The heat exchanger has a second set of heat exchanger elements extending internally to the battery enclosure. The second set of heat exchanger elements are in fluid communication with internal air within the battery enclosure.

The system includes at least one of an external damper door and an internal damper door. The external damper door is configured to control the flow of the external ambient air into the first set of heat exchanger elements. The internal damper door is configured to control the flow of the internal air into the first set of heat exchanger elements.

A method of vehicle battery thermal management is also disclosed. The method in one embodiment includes providing a heat exchanger mounted within an exterior wall of a battery enclosure housing a plurality of batteries, the heat exchanger having a first set of heat exchanger elements extending externally to the battery enclosure, the first set of heat exchanger elements being in fluid communication with external ambient air and a second set of heat exchanger elements extending internally to the battery enclosure, the second set of heat exchanger elements being in fluid communication with internal air within the battery enclosure; and controlling at least one of the flow of the external ambient air into the first set of heat exchanger elements and the flow of the internal air into the first set of heat exchanger elements.

BRIEF DESCRIPTION OF THE DRAWINGS

The details of the present disclosure, both as to its structure and operation, can be understood by referring to the accompanying drawings, in which like reference numbers and designations refer to like elements.

DETAILED DESCRIPTION

Figure 1:
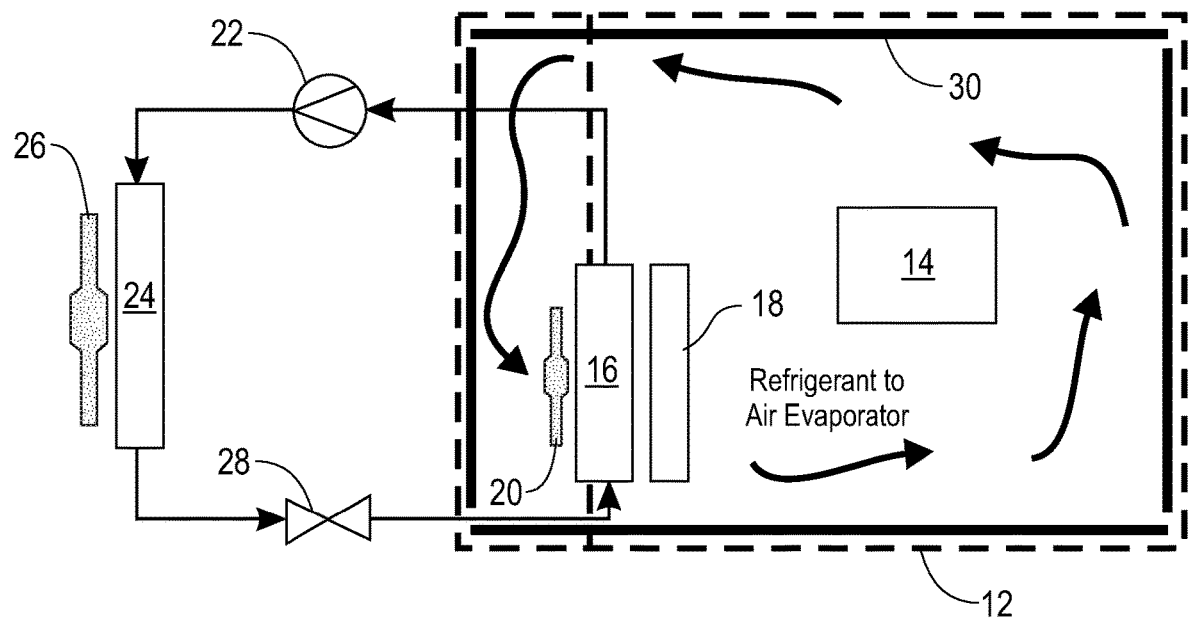
FIG. 1 is a schematic illustration of a prior art vehicle battery thermal management system.

Many hybrid and electric vehicle manufacturers have employed closed loop active thermal management systems to cool the batteries. The batteries use a typical air conditioning system (A/C) such as those used in recreational vehicles or passenger vehicles. A conventional hybrid vehicles use a traditional active A/C cooling system as illustrated in FIG. 1. FIG. 1 is a schematic illustration of one embodiment of a vehicle battery thermal management system 10. A battery enclosure 12 houses plurality of batteries 14. An evaporator 16, heater 18 and internal fan 20 are located inside the battery enclosure 12. A compressor 22, condenser 24, external fan 26 and expansion valve 28 are located outside the battery enclosure 12. Air is transmitted from the condenser 24 to the evaporator 16 to generate cooling air within the battery enclosure 12. The internal fan 20 circulates the cooling air throughout the battery enclosure 12. The fan also transmits air heated by the heater 18 when heat is required. In one embodiment, insulation 30 is added to the battery enclosure 12 to lessen the load and size on the A/C system due to losses of heat and/or cooling through the enclosure 12. Once the insulation 30 is added, this increasingly isolates the system from the outside ambient and requires the A/C system to be used more on cold days as well as hot days, at a significant cost due to extra power usage and maintenance.

Figure 2:
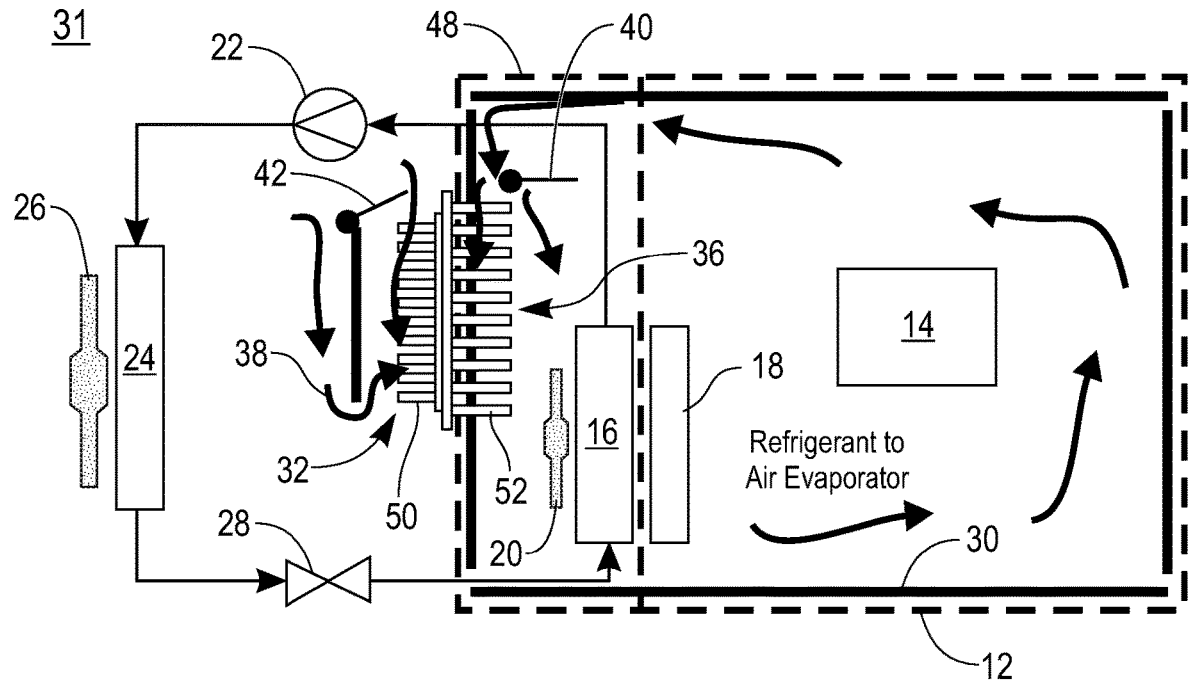
FIG. 2 is a schematic illustration of an internal active air cooled battery thermal management system 31 according to the present disclosure.

FIG. 2 is a schematic illustration of an internal active air cooled battery thermal management system 31 according to the present disclosure. The system 31 includes the implementation of an air to air heat exchanger 32 that employs the external fan 26 and the internal fan 20 to allow for the system to utilize, when necessary, external ambient air to augment cooling on cold days and allow for the compressor 22 to be shut down for greater efficiency. The use of a damper door on either the evaporator side and/or the condenser side of the heat exchanger 32 can channel the air through the heat exchanger 32 or bypass the heat exchanger 32 depending on ambient conditions. The exemplary embodiment shown in FIG. 2 has damper doors 40 and 42 on the two sides of the heat exchanger, respectively. This allows efficient use of the A/C system without increasing its size due to losses from the battery enclosure 12 to the ambient. This embodiment reduces the number of added parts of the thermal management system 31 and eliminates liquid cooling and leak potentials in the battery enclosure 12. The thermal management system 31 has lower cost, more reliable cooling system of batteries by being more energy efficient than the prior art system of FIG. 1.

Air-to-air heat exchanger 32 may be one a several known types such as a cross flow heat exchanger, a cross plate heat exchanger, a countercurrent heat exchanger, a rotary heat exchanger a heat pipe or a fine wire heat exchanger.

Figure 3:
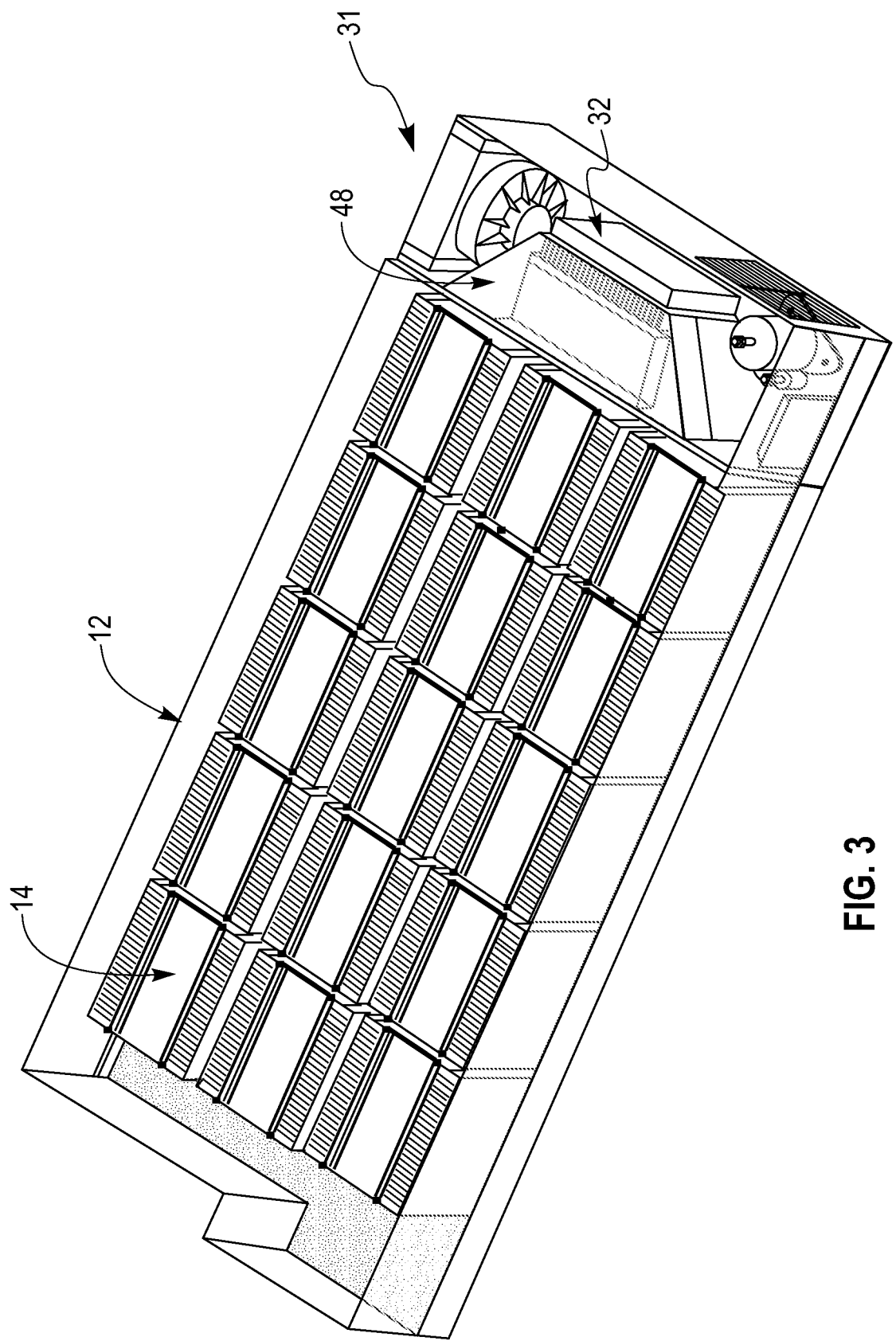
FIG. 3 is an isometric view of one embodiment of the thermal management system of the present disclosure.
Figure 4:
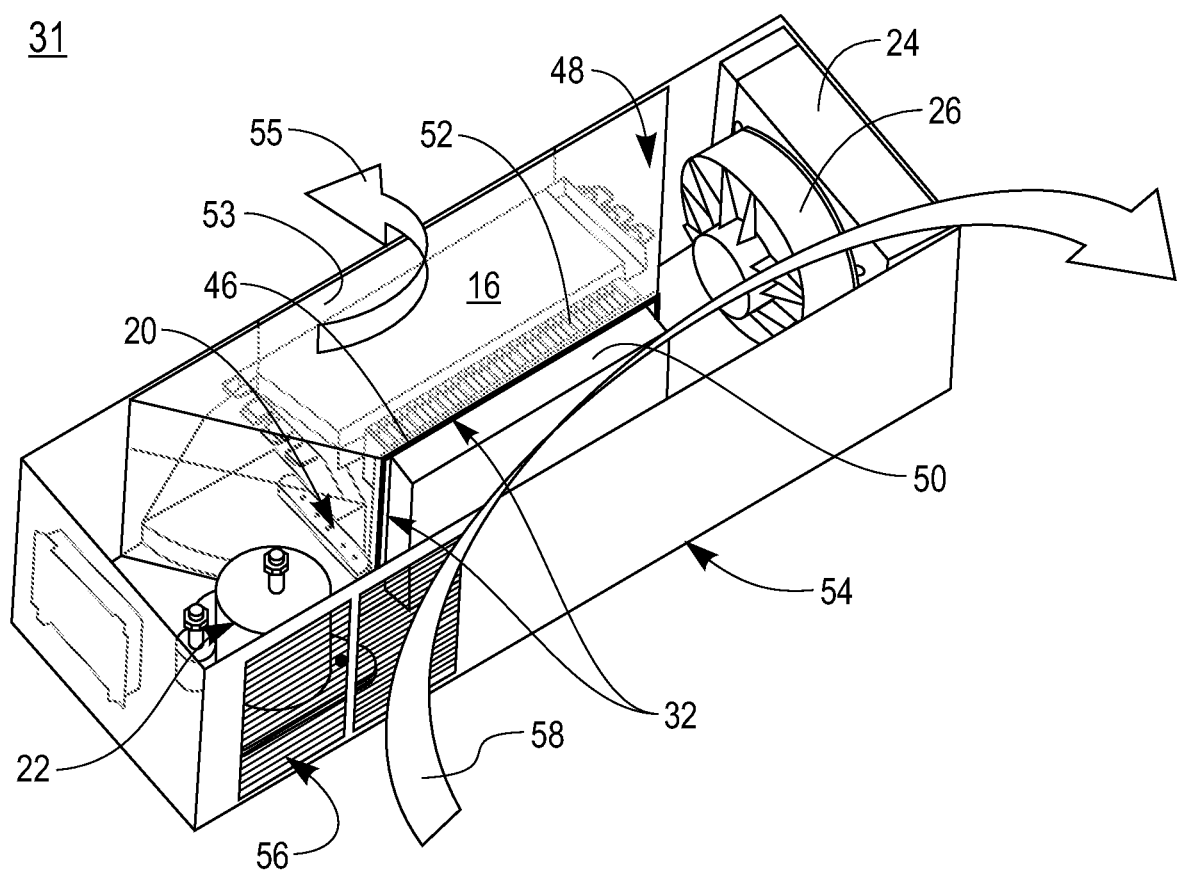
FIG. 4 is an isometric view of one embodiment of an external compartment of the thermal management system of the present disclosure.

FIG. 3 is an illustrative isometric view of one embodiment of the thermal management system 31 coupled to the battery enclosure 12. FIG. 4 is an isometric view of one embodiment of the thermal management system 31. The enclosure 12 houses a plurality of batteries 14. The heat exchanger 32 is mounted in a section wall 46 of an internal compartment 48 such that one section 50 of heat exchanger elements are on the condenser side of the wall 46 and a second section 52 of heat exchanger elements are on the evaporator side of the wall 46. The internal compartment 48 houses the evaporator 16 and the internal fan 20. The heater 18 (see FIG. 2) is mounted internally of the battery enclosure 12. The internal compartment 48 has an opening 53 facing the battery enclosure 12 to allow internal air 55 to be drawn from the battery enclosure 12 into the internal compartment 48 by the internal fan 20. The internal air 55, drawn into the internal compartment 48 by the internal fan 20, is drawn into the heat exchanger elements 52.

An external compartment 54 houses the compressor 22, condenser 24, external fan 26 and expansion valve 28 (see FIG. 2). The external compartment 54 has an opening 56 to allow external ambient air 58 to be drawn into the external compartment 54 by external fan 26. The external air 58, drawn into the external compartment 54, is drawn into the heat exchanger elements 50. The outside air entering the heat exchanger elements 38 is exchanged with inside air entering the heat exchange elements 36. The cool external air enters the battery enclosure 12 through the internal compartment 48 and the warm internal air exits the external compartment 54 through condenser 24.

In one embodiment, the air to air heat exchanger 32 is a heat pipe closed-loop system that lowers the temperature in a battery enclosure 12 while protecting the batteries 14 from outside contaminants. The heat exchanger elements 36 and 38, respectively, are formed of one end of a heat pipe that extends into the battery enclosure 12 and on the opposite end of the heat pipe that extends into the external compartment 54. In one embodiment, there is a fluid, typically a liquid refrigerant, in the end of the sealed heat pipe located in the battery enclosure 12. Air in the battery enclosure 12 is heated by the excess heat generated by batteries 14. As the liquid is heated it turns into a vapor and rises to the top of the heat pipe, which is located in the external compartment 54. Because the temperature outside the battery enclosure 12 is lower than it is inside the battery enclosure 12, the vapor cools and returns to liquid form, repeating the cycle and forming a type of vapor chamber. No air is circulated into or out of the battery enclosure 12, protecting the batteries 14 from contaminants in the air. The air-to-air heat exchanger 32 may include aluminum fins, end plates and a baffle connected to the heat pipe to improve conduction and avoid corrosion.

Figure 5:
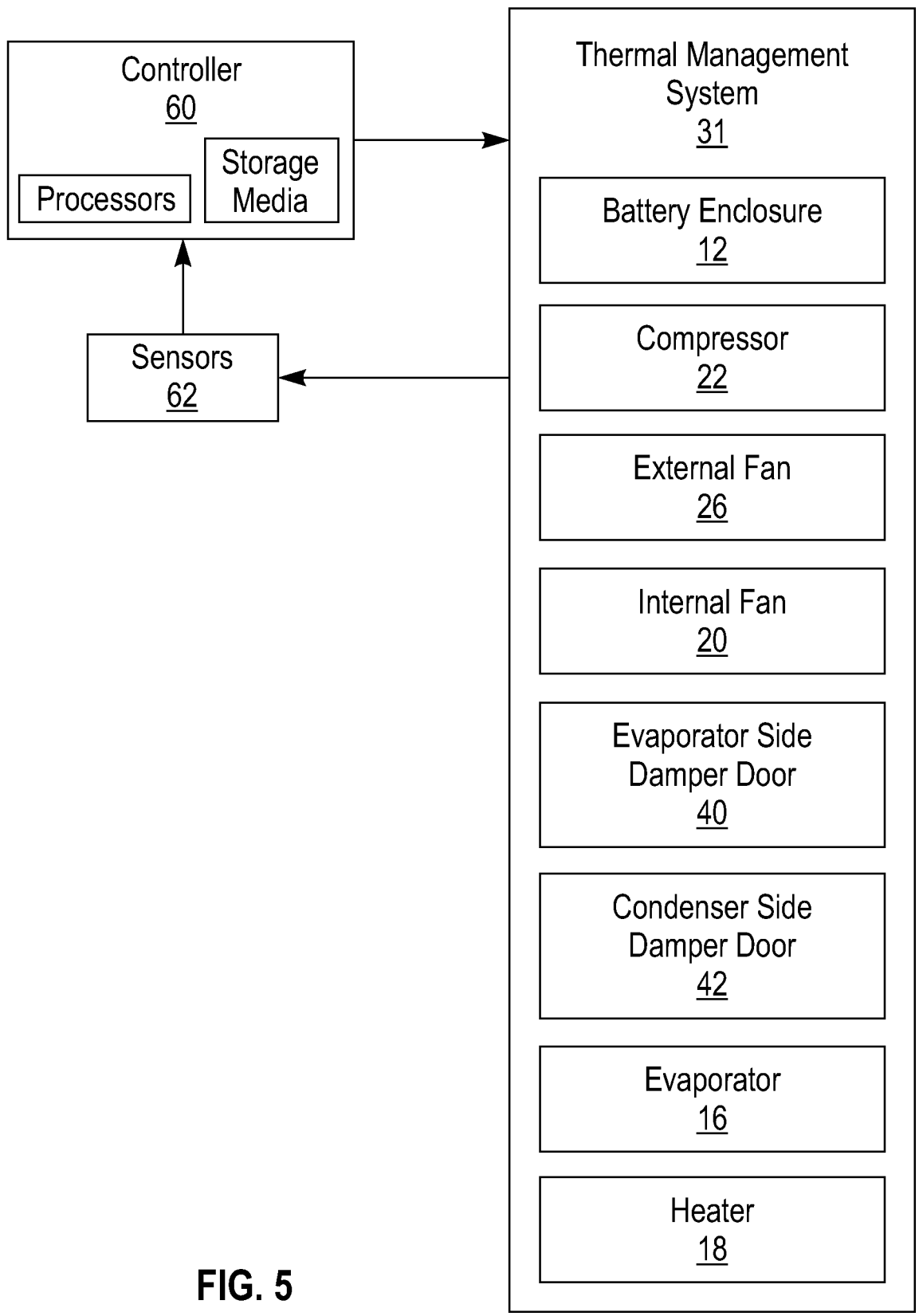
FIG. 5 is a block diagram of one embodiment of a system for controlling the operation of the thermal management system of the present disclosure.

FIG. 5 is a block diagram of one embodiment of a system for controlling the operation of the thermal management system 31. A controller 60 may comprise a computer system of one or more computer processors, one or more non-transitory computer-readable storage media and program instructions, stored on the one or more non-transitory computer-readable storage media, which when implemented by the one or more processors, cause the controller control the operation of the components of the thermal management system 31.

A computer system is only one example of a suitable processing system and is not intended to suggest any limitation as to the scope of use or functionality of embodiments of the methodology described herein. The processing system may be operational with numerous other general purpose or special purpose computing system environments or configurations. Examples of well-known computing systems, environments, and/or configurations that may be suitable for use with the processing system in may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Each of the components of the thermal management system 31 is configured to be controlled by control signals from the controller 60. The control system includes various sensors 62 positioned at locations at or near the respective components of the thermal management system 31. The sensors 62 send signals to the controller 60 obtained from the thermal management system 31 components. For example, the sensors determine the temperature of the battery enclosure 12 and the operating conditions of the external fan 26 and internal fan 20, the compressor 22, the evaporator 16, heater 18 and the damper doors 40 and 42.

In one embodiment, the controller 60 has program instructions based on control laws establishing the conditions under which the components of the thermal management system 31 are controlled. For example, various modes may include the following modes with respect to the damper doors: (1) evaporator side damper door 40 open and condenser side damper door 42 closed; (2) evaporator side damper door 40 closed and condenser side damper door 42 open; (3) evaporator side damper door 40 open and condenser side damper door 42 open; and (4) evaporator side damper door 40 closed and condenser side damper door 42 closed.

In addition to control of the damper doors, other modes may include combinations of the operating conditions of the external fan 26 and internal fan 20, the compressor 22, the evaporator 16 and heater 18.

Figure 6:
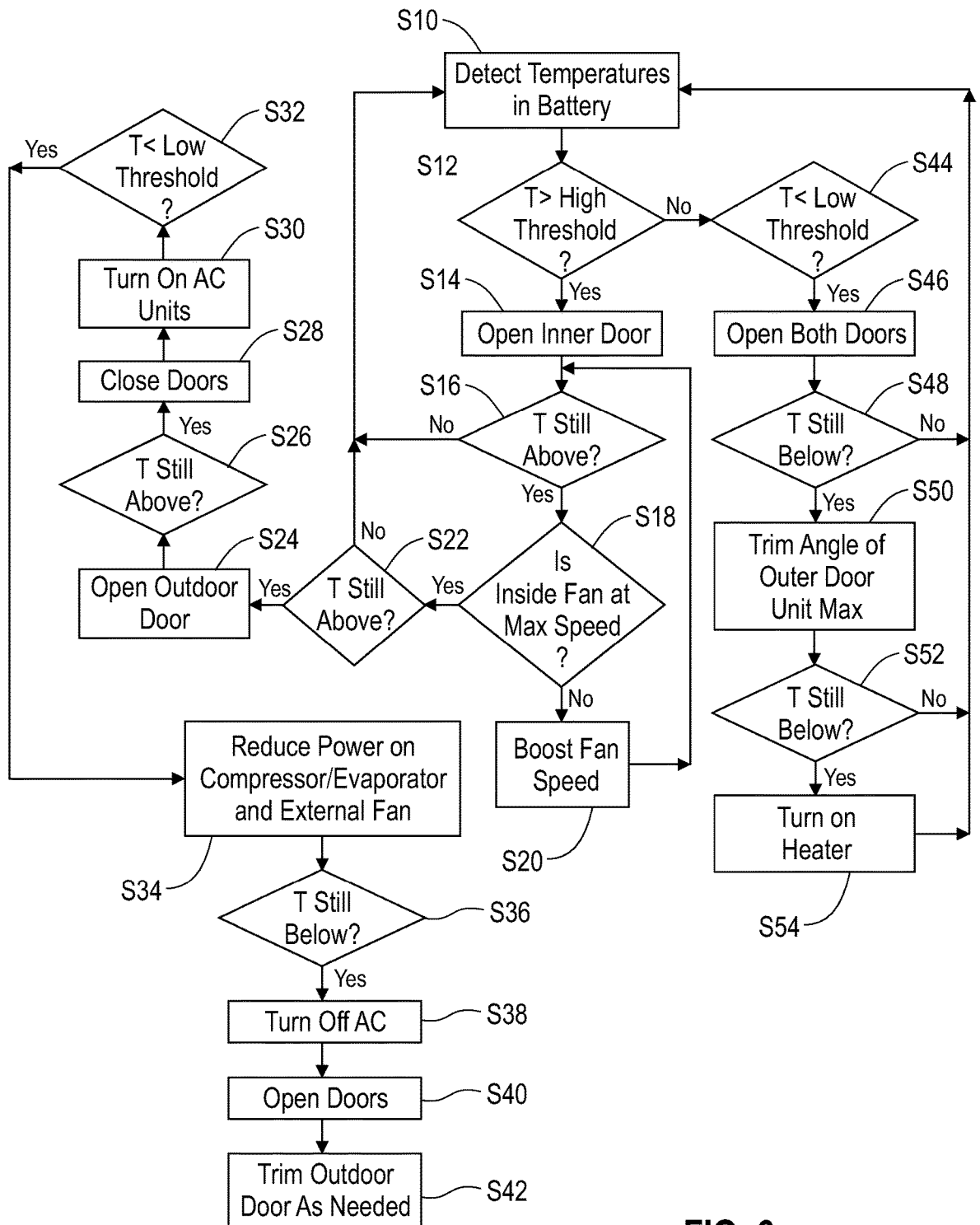
FIG. 6 is a flow diagram of one embodiment of a thermal management control method of the present disclosure.

FIG. 6 is a flow diagram of one embodiment of a thermal management control method of the present disclosure. In step S10, a plurality of sensors 62 detect the temperature of each of the batteries 14 in the battery enclosure 12 and sends that data to the controller 60. In step S12, the controller 60 determines if the highest battery temperature HiT is above a high threshold HTH. The HiT is above TH, Yes at step S12, then the inner damper door 40 is opened at step S14. The controller 60 then determines at step S16 if HiT still above HTH based on the continued input of battery temperature data from sensors 62. If HiT is no longer above HTH, the process returns to step S10.

If HiT is still above HTH, at step S18 the controller determines if internal fan 20 is at maximum speed. If the internal fan 20 is not at maximum speed, at step S20 the controller 60 boosts the speed of internal fan 20 at a predetermined increment and the process retunes to step S16. A process loop of steps S16, S18 and S20 continues until the maximum speed of internal fan 20 is reached, Yes at step S18. At step S22 the controller 60 determines if HiT is still above HTH with the speed of internal fan 20 at maximum. If HiT is no longer above TH, the process returns to step S10.

If HiT is still above HTH, at step S24 the controller opens external damper door 42. At step S26 the controller 60 determines if HiT still above HTH. If HiT is still above HTH, Yes at step S26, the controller 60 at step S28 closes doors 40 and 42 and at step S30 turn air conditioning (A/C) components of the evaporator 16, internal fan 20, compressor 22, condenser 24 and external fan 26.

The controller 60 then monitors the temperature data of the batteries at step S32 and if the lowest temperature of one of batteries, LoT, is below a low threshold LTH, Yes at step S32, at step S34 the controller 60 reduces power on the A/C components. At step S36 the controller 60 monitors the temperature data of the batteries at step S34 and if LoT is still below LTH for a predetermined time period, Yes at step S36, at step S38 the controller 60 turns off the a/c components and at step S40 open the damper doors 40 and 42. At step S42 the controller 60 monitors the battery temperature and controls the angle of external door 42 as needed to control the amount of ambient air passing over the heat exchanger external elements 50.

Returning to step S12, if HiT is not above HTH, No at step S12, at step S44 the controller 60 monitors the battery temperature data to determine if LoT is below LTH. If LoT is below LTH, Yes at step S44, at step S46 the controller opens both damper doors 40 and 42 at a first angle to let ambient air passing over the heat exchanger 32 to raise the temperature of the batteries. At step S48 the controller 60 monitors the battery temperature data to determine if LoT is still below LTH after a predetermined time period. If LoT is still below LTH after the predetermined time period, Yes at step S48, at step S50 the controller 60 increases the angle of external door 42 is open to increase the amount of ambient air passing over the heat exchanger external elements 50. After each adjustment of the angle of the external damper door 42, the controller determines if LoT is still below LoT until the damper door 42 is open the maximum amount. At step S52, if LoT is still below LTH with the damper door 42 open the maximum amount, Yes at step S52, the controller at step S54 turns on heater 18. At steps S42 and S52 if LoT is no longer below LTH, the process returns to step S10.

In one embodiment, an ambient temperature sensor provides the temperature of the external air outside the thermal management system 31 to the controller 60 and the angle of the external damper door 42 is adjusted based on the ambient temperature. Various factors will impact the control points of the thermal management control system, including the size of the battery enclosure 12, the number of batteries 14 the size of the batteries 14, the size the A/C components and the size of the heat exchanger 32.

In addition, while preferred embodiments of the present invention have been described using specific terms, such description is for illustrative purposes only, and it is to be understood that changes and variations may be made without departing from the spirit or scope of the following claims.

What is claimed is:

1. A vehicle battery thermal management system comprising:
   a battery enclosure housing a plurality of batteries;
   a heat exchanger mounted within an exterior wall of the battery enclosure, the heat exchanger having a first set of heat exchanger elements extending externally to the battery enclosure, the first set of heat exchanger elements being in fluid communication with external air and a second set of heat exchanger elements extending internally to the battery enclosure, the second set of heat exchanger elements being in fluid communication with internal air within the battery enclosure;
   an external damper door configured to control the flow of the external air into the first set of heat exchanger elements and an internal damper door configured to control the flow of the internal air into the second set of heat exchanger elements;
   a control system for controlling the external damper door and the internal damper door to augment cooling of the battery enclosure; and
   one or more first sensors configured to send signals to the control system indicative of the operating position of the external damper door and the internal damper door,
   wherein the control system is configured to control an angle of the external damper door and the internal damper door based on the signals received from the one or more first sensors, and
   wherein the external damper door is located upstream of an air inlet to the first set of heat exchanger elements.

2. The vehicle battery thermal management system of claim 1, further including an air conditioning system configured for cooling the battery enclosure.

3. The vehicle battery thermal management system of claim 1, further including an internal compartment having an opening in fluid communication with the battery enclosure, wherein the second set of heat exchanger elements extend within the internal compartment.

4. The vehicle battery thermal management system of claim 3, further including an internal fan mounted within the internal compartment, the internal fan being configured to circulate the internal air entering the battery enclosure from the second set of heat exchanger elements.

5. The vehicle battery thermal management system of claim 1, further including an external compartment having an opening in fluid communication with the external air, wherein the first set of heat exchanger elements extend within the external compartment.

6. The vehicle battery thermal management system of claim 5, further including an external fan mounted within the external compartment, the external fan being configured to draw the external air into the first set of heat exchanger elements.

7. The vehicle battery thermal management system of claim 1, further including one or more second sensors configured to send signals to the control system indicative of the operating position of one or more components of an air conditioning system, wherein the control system is configured to control the operation of the one or more components of the air conditioning system based on the signals received from the one or more second sensors.

8. The vehicle battery thermal management system of claim 1, further including one or more second sensors configured to send signals to the control system indicative of the operating position of one or more components of an air conditioning system, wherein the control system is configured to control the operation of the one or more components of the air conditioning system and the operation of the external damper door and the internal damper door based on the signals received from the one or more first and second sensors.

9. The vehicle battery thermal management system of claim 1, wherein the heat exchanger is an air-to-air heat exchanger.

* * * * *